April 10, 1928.
J. J. JONES
1,665,812
HOSE OR PIPE COUPLING
Filed Oct. 28, 1922
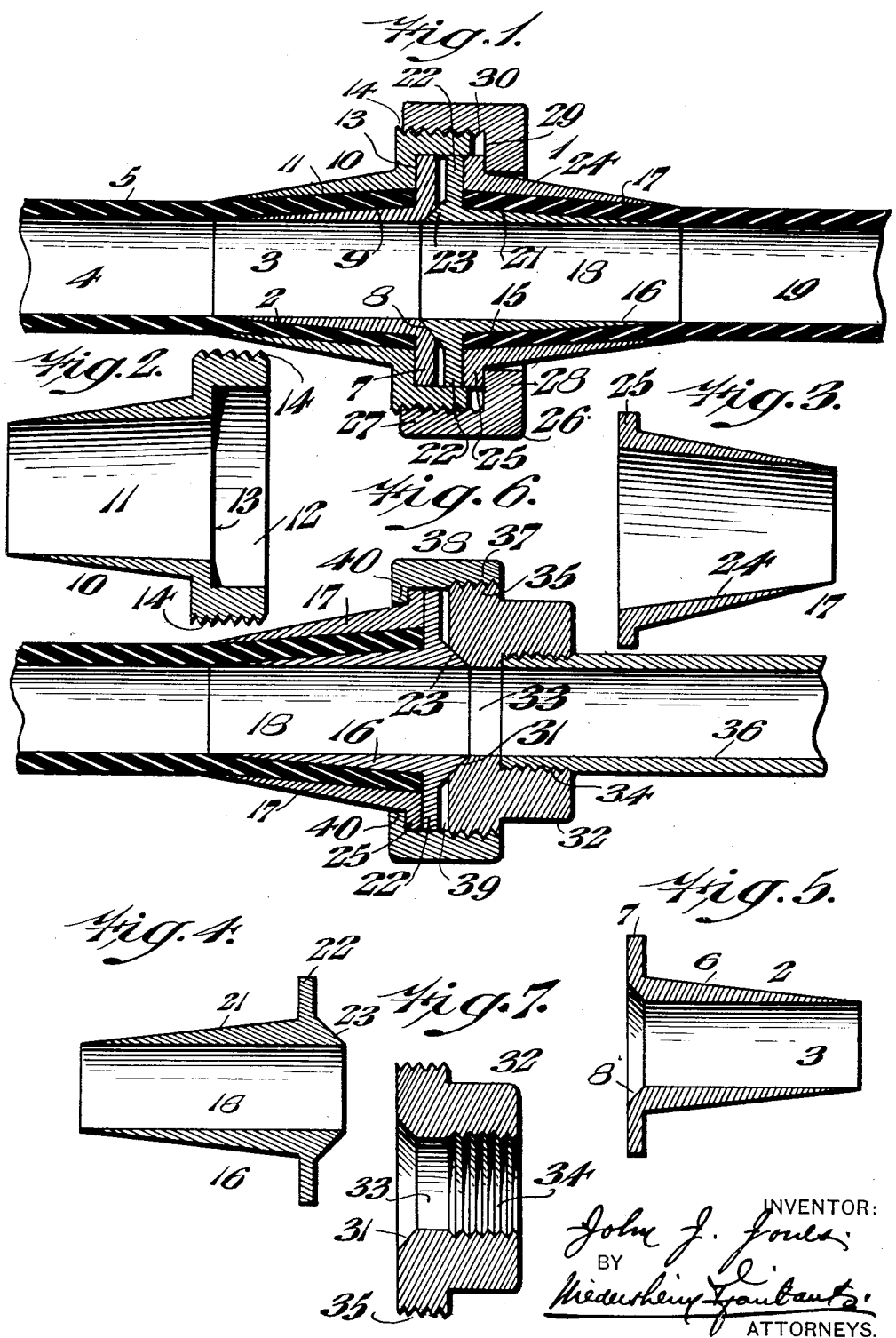
INVENTOR:
John J. Jones
BY
ATTORNEYS.

Patented Apr. 10, 1928.

1,665,812

UNITED STATES PATENT OFFICE.

JOHN J. JONES, OF RIDLEY PARK, PENNSYLVANIA.

HOSE OR PIPE COUPLING.

Application filed October 28, 1922. Serial No. 597,463.

My invention consists of a novel construction of a hose or pipe coupling, wherein the terminals of the hose are expanded and held between inner bushings and outer sleeves of novel construction, which bushings are provided with male and female counter bores in conjunction with an external coupling ring adapted for securing the coupling members in assembled position.

It further consists of a novel construction of coupling devices adapted for the coupling of a rubber or flexible hose and a rigid or metallic pipe or tubing, whereby a very effective tight joint is produced.

It further consists of a novel construction of bushings, sleeves and coupling devices, all as will be hereinafter set forth.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a longitudinal sectional view of the hose coupling, embodying my invention showing the same as applied to rubber or other flexible hose.

Figure 2 represents a sectional view of one of the outer sleeve members in detached position.

Figure 3 represents a longitudinal sectional view of the other sleeve member of the coupling in detached position.

Figure 4 represents a longitudinal sectional view of one of the bushing members having a male counter bore thereon.

Figure 5 represents a longitudinal sectional view of the opposite or co-acting bushing member, showing the female counter bore thereon.

Figure 6 represents a longitudinal sectional view showing my invention as applied to a rubber or flexible hose and to a metallic or rigid tubular section.

Figure 7 represents a sectional view of the coupling nut seen in Figure 6.

Similar numerals of reference indicate corresponding parts in the figures.

Referring to the drawings:—

In carrying out my invention, I have shown the same in Figures 1 to 5 as adapted to the ends of a rubber or flexible hose, and in Figures 6 and 7, I have shown the same as adapted to the coupling of a flexible or rubber hose and a rigid or metal section of piping or tubing, the structure in Figures 1 to 6 being first described in detail.

1 designates my novel construction of hose coupling, the same comprising the inner left hand bushing or member 2, whose inner bore 3 is of substantially the same diameter as the bore 4 of the hose 5, said member having the outer conical wall 6, which terminates in the flange 7, within which is the bevel or female counter bore 8.

The member 2 is inserted into the end of one of the hose sections as 5 to be coupled and the end of the hose is consequently expanded as indicated at 9. 10 designates an outer sleeve like member, which has the inner conical or tapering bore 11, terminating in the enlarged chamber 12 having the shoulder 13, the outer peripheral wall of which is exteriorly threaded as indicated at 14.

The sleeve 10 and the bushing 2 are assembled with respect to the hose 5 as seen at the left of Figure 1, the flange 7 abutting against the shoulder 13, and the outer periphery of said flange fitting nicely within the chamber 12.

The end of the right hand hose section 15 is contained between the inner bushing member 16 and the outer sleeve member 17. The member 16 has the inner bore 18 of substantially the same diameter as the inner bore 19 of the contiguous hose section, while its outer wall 21 is conical or tapering, and provided with the flange 22 beyond which is the male counterbore 23 which engages the bevel or female counterbore 8. When the parts are assembled as seen in Figure 1, the sleeve 17 has the inner conical wall 24, and the terminal flange 25, and the portion 15 of the right hand hose section is retained between the conical surfaces 21 and 24, with the flanges 25 and 22 in contact as will be understood from the right of Figure 1. The coupling ring or nut 26 is composed of the angularly arranged members 27 and 28, the latter having the inner wall 29 adapted to contact with the flange 25 and the member 27 being internally threaded at 30 to engage the threads 14.

The manner of assembling the coupling devices will be apparent from Figure 1, and it will be obvious that as the coupling nut 26 is tightened, the contact of the flanges 25 and 22 will force the male and female counterbores 23 and 8 tightly into contact, so that a tight joint is ensured and a very effective coupling action is produced.

In the construction seen in Figures 6 and 7 I have shown the means employed for coupling a flexible or rubber hose seen on the left of Figure 6 with a rigid or metallic pipe or tube seen on the right of said figure. The parts seen at the left of Figure 6, comprises the sleeve 17 and the bushing 16 already described, and the male counterbore 23 seen in Figure 6, is held against the bevelled wall or female counterbore 31 of the member 32, which has the bore 33 therethrough and is internally threaded at 34 and externally threaded at 35. The threads 34 are engaged by the threaded end of the metallic pipe or tube 36, and the threads 35 are engaged by the internally threaded portion 37 of the coupling ring 38 which has the chamber 39 for the reception of the flanges 22 and 25 and the inturned flange 40 engages the flange 25, when the coupling ring 38 is tightened, it being apparent that the tightening of said ring brings the counterbores or surfaces 23 and 31 into close contact. In both the constructions seen in Figures 1 and 6, it will be apparent that when the coupling or locking ring is tightened, the flared end of the flexible hose will tend to be slightly compressed between the contiguous bushing and sleeve, and in both the constructions seen in Figures 1 and 6 the cross sectional area or bore of the coupling devices is the same as that of the hose or pipe sections which are coupled together, so that there is no obstruction to the flow of the fluid or liquid through the coupling devices.

The construction seen in Figure 6, can be effectively used in sand blast apparatus, the sand being directed upon the desired point by the metallic pipe section 36. The flared end of the flexible hose is frictionally held between the juxtaposed conical surfaces of the bushing and sleeve in each instance, and does away with the exterior clamping devices for securing the coupling to the hose, which have heretofore been employed. As is evident the conical surfaces may be slightly out of parallel, so as to grip the flared hose end tightly.

It will now be apparent that I have devised a novel and useful hose coupling which embodies the feature of advantage enumerated as desirable in the statement of the invention and the above description, and while I have, in the present instance, shown and described a preferred embodiment thereof which will give in practice satisfactory and reliable results it is to be understood that such embodiment is susceptible of modification in various particulars without departing from the spirit or scope of the invention or sacrificing any of its advantages.

Having thus described my invention, what I claim as new and desire to secure by Letters Patent, is:—

In a device of the character stated, an inner bushing having a conical exterior wall, a terminal right angled flange and a female counterbore, an outer concentric sleeve having a conical interior wall concentric with said conical exterior wall, and an exteriorly threaded outer longitudinal wall and a hose section having its flared end held entirely between said bushing and sleeve, in combination with another juxtaposed inner bushing having a conical outer wall, a right angled flange and a male projection contiguous to said female counterbore, an outer sleeve having a conical interior surface concentric with said last mentioned conical bushing, a hose section having its flared end held entirely between said last mentioned bushing and sleeve, and provided with a right angled flange contacting with said last mentioned right angled flange, and an outer internally threaded coupling ring having a shoulder engaging said last mentioned flange, said three right angled flanges being confined between said coupling ring and said outer longitudinal threaded wall.

JOHN J. JONES.